(12) United States Patent
Neff et al.

(10) Patent No.: US 6,289,285 B1
(45) Date of Patent: Sep. 11, 2001

(54) SEISMIC VELOCITY ANALYSIS FOR CLASS II SANDS

(75) Inventors: Dennis B. Neff; Carl B. Sigler, III, both of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/464,928

(22) Filed: Dec. 16, 1999

(51) Int. Cl.[7] .................................................. G01V 1/28
(52) U.S. Cl. .............................................................. 702/16
(58) Field of Search ................................ 702/14, 16, 17; 367/52, 57

(56) References Cited

U.S. PATENT DOCUMENTS

| | | | |
|---|---|---|---|
| 5,008,861 | 4/1991 | Gallagher | 367/59 |
| 5,058,079 | 10/1991 | Wright et al. | 367/59 |
| 5,440,525 | 8/1995 | Dey-Sarkar et al. | 367/52 |
| 5,661,697 | 8/1997 | Swan et al. | 367/47 |
| 5,784,334 | 7/1998 | Sena et al. | 367/47 |

*Primary Examiner*—Donald E. McElheny, Jr.
(74) *Attorney, Agent, or Firm*—George E. Bogatie; Ryan N. Cross

(57) ABSTRACT

A method and apparatus are disclosed for processing seismic trace data to distinguish Class II sand formations sandwiched between low and high porosity layers, where the intermediate sand layer causes a polarity reversal with offset in seismic reflections. A velocity analysis of data from a vertical seismic section is generated to include coherency contours corresponding to polarity reversals in the seismic traces by using an extended crosscorrelation algorithm for multi-trace coherency. The velocity analysis thus indicates a stacking velocity that will maximize coherency of the seismic traces exhibiting the polarity reversal.

12 Claims, 4 Drawing Sheets

(3 of 4 Drawing Sheet(s) Filed in Color)

SEISMIC VELOCITY ANALYSIS FOR CLASS II SANDS

This invention relates to seismic prospecting for oil or gas reservoirs, and more specifically it relates to data processing techniques applied in the velocity analysis of seismic signals which aid in detecting hydrocarbon bearing Class II sand formations.

BACKGROUND OF THE INVENTION

For many years seismic exploration for oil and gas reservoirs has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earth's surface. The acoustic waves generated in the earth by these sources are partially transmitted back from strata boundaries and reach the surface of the earth at varying time intervals, depending on the distance and the characteristics of the subsurface traversed. These returning waves are detected by the geophones, which function to transduce such acoustic waves into representative electrical analog signals. In use an array of geophones is generally laid out along a line to form a series of observation stations within a desired locality, the source injects acoustic signals into the earth, and the detected signals are recorded for later processing using digital computers where the analog signals are generally quantized as digital sample points, e.g., one sample every two milliseconds, such that each sample point may be operated on individually. Accordingly, seismic field records are reduced to vertical and/or horizontal cross sections which approximate subsurface features. The acoustic source and the geophone array are then moved along the line to a new position and the process repeated to provide a seismic survey. More recently, seismic surveys involve geophones and sources laid out in generally rectangular grids covering an area of interest so as to expand real coverage and enable construction of three dimensional (3D) views of reflector positions over wide areas.

After exploration of an area is completed, data relating to energy detected at a plurality of geophones will have been recorded, where the geophones are located at varying distances from the shotpoints. The data is then reorganized to collect traces from data transmitted at various shotpoints and recorded at various geophone locations, where the traces are grouped such that the reflections can be assumed to have been reflected from a particular depth point within the earth, i.e., a common midpoint (CMP). The individual traces are then corrected for the differing distance the seismic energy travels through the earth from the corresponding shotpoints, to the common midpoint, and upwardly to the various geophones. This step includes correction for the varying velocities through the rock layers of different types. The correction for the varying spacing of shotpoint/geophone pairs is referred to as "normal move out." After this is done the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoint data, and is well known to those skilled in the art.

The seismic traces can be processed to provide various measures of the velocity at which seismic waves travel in the earth as a function of depth. The process of determining a velocity for use in the stacking of CMP gathers, or for more detailed velocity determinations, is referred to as velocity analysis. The desired stacking velocity is that velocity producing the maximum coherency in primary reflection data. Accordingly, velocity analysis is essentially a "trial and error" procedure to determine the time corrections necessary to align reflections recorded at a common midpoint with varying source-receiver distances (offsets). A velocity spectrum is a display of trial stacking velocities as a function of travel time with a contoured display of coherency for a particular location or a common midpoint location along the seismic line. The most commonly used measure of coherency is the semblance coefficient. Such semblance velocity spectra can be produced by techniques well known to those skilled in the art, and can be automatically produced using commercially available software.

The sole purpose of these data processing efforts is to facilitate the final and most critical phase of the seismic exploration method, namely, data interpretation, which is reduction of the data to a realistic model of subsurface strata illustrating both structural configurations and geologic characteristics.

Seismic interpretation involves prospecting for rocks that have both high and low porosity. Class II sands, which represents the transition between high and low porosity sandstone reservoir rocks, often have an anomalous amplitude versus offset response that includes a reversal of polarity in the field records, depending on whether shot/receiver pairs are closely spaced or far apart (i.e., near versus far offset). The problem today is that the above mentioned standard seismic velocity analysis and stacking programs using a convenient measure of coherence, e.g., semblance performed with a computer, are intentionally designed to remove any polarity reversals in the common midpoint depth gathers. Therefore, the evidence for existence of these Class II sands is often obscured or completely destroyed in standard seismic velocity analysis processing.

Accordingly, it is an object of this invention to generate seismic velocity analyses and to stack sections in such a manner as to accentuate the existence, position and quality of Class II sand polarity reversals.

It is a more exact object of this invention to distinguish hydrocarbon-bearing Class II sand formations from neighboring shales and limestones.

It is a further object to locate polarity reversals directly on vertical seismic data sections.

A still further object of this invention is to improve seismic amplitude-versus-offset (AVO) analyses by using velocities picked to accentuate a polarity reversal.

SUMMARY OF THE INVENTION

According to the present invention the foregoing and other objects and advantages are attained in a computer implemented method and apparatus for processing seismic trace data in a velocity analysis which contours measures of coherency for a seismic section having traces showing polarity reversal with offset. This velocity analysis is based on a sliding window correlation technique, and uses an extended crosscorrelation algorithm in determining a measure of multi-trace coherence.

In a preferred embodiment, the sliding window correlation technique first gathers CMP traces, applies a normal moveout correction to all traces in the gather, and then analyzes a few adjacent traces located in a subgroup of the gather for multi-trace coherency over a preselected time window. In this sliding window technique, a multi-trace coherency value is determined that is based on a crosscorrelation combined with an absolute amplitude difference value between the waveforms of the two traces being compared. This extended cross-correlation is referred to herein as an RB-algorithm. The sliding window is incrementally moved horizontally over the seismic section, and with each movement the analyzed subgroup is replaced with a new subgroup to be analyzed. The RB-algorithm for multi-trace coherency is applied at each increment. This process is continued until all of the horizontal subgroups of traces have been processed at the particular time window. The individual RB subgroup values are then summed to give a composite coherency value for that velocity and time window increment. The time window is then incremented downward to the next time step and the RB-algorithm is again applied to subgroups as described above until a desired number of time windows have been processed. This entire process is then repeated for a series of trial velocities to complete the analysis of the section.

The method for detecting hydrocarbon bearing Class II sand formations can involve reviewing well logs that show a Class II sand response, and if polarity reversals are present, key seismic lines can be reprocessed using the sliding window correlation with the RB-algorithm to determine correct stacking velocities for the reflectors showing polarity reversals.

Side-by-side display of a semblance velocity analysis, a sliding windowlRB algorithm velocity analyses, and the applicable seismic record section provides a display which aids the interpreter in picking optimum stacking velocities for areas with or without polarity reversals.

Still other objects and advantages of the present invention will become readily apparent to those skilled in this art from the following detailed description and the drawings, wherein there is shown and described only one of several preferred embodiments of the invention. As will be realized several details of this invention are capable of modification in various obvious respects without departing from the invention. Accordingly, the drawings and description are to be regarded as illustrative, and not as restrictive in nature.

The method and apparatus of the invention, using the RB algorithm coherency value with the sliding window correlation for generating velocity analysis and stacked seismic sections, accentuates rather than eliminates coherency contours resulting from reflectors which cause polarity reversals with offset. This feature, which accentuates polarity reversals, can be very useful in exploration. One reason for this is because the location of the vertical transition between higher porosity to lower porosity sands can be seen directly on the seismic data. Accordingly, hydrocarbon prospecting above this location involves looking generally for bright amplitudes, while hydrocarbon sands below this interval will mostly be dimming amplitudes. Knowing where to look for bright versus dim events is a major advantage to the interpreter. Also polarity reversals in depth point gathers of seismic traces may signify the presence of hydrocarbons, as in Class II sands, and comparison of structural position and further AVO (amplitude versus offset) analysis could then confirm the presence of hydrocarbons. Further, correlation across faults and complex structures is facilitated due to the limited number of reflectors present on the seismic display processed with the sliding window technique.

BRIEF DESCRIPTION OF THE DRAWINGS

The file of the patent contains at least one drawing executed in color. Copies of this patent with the color drawing will be provided by the Patent and Trademark Office upon request and payment of the necessary fee.

DETAILED DESCRIPTION OF THE INVENTION

Figure 1:
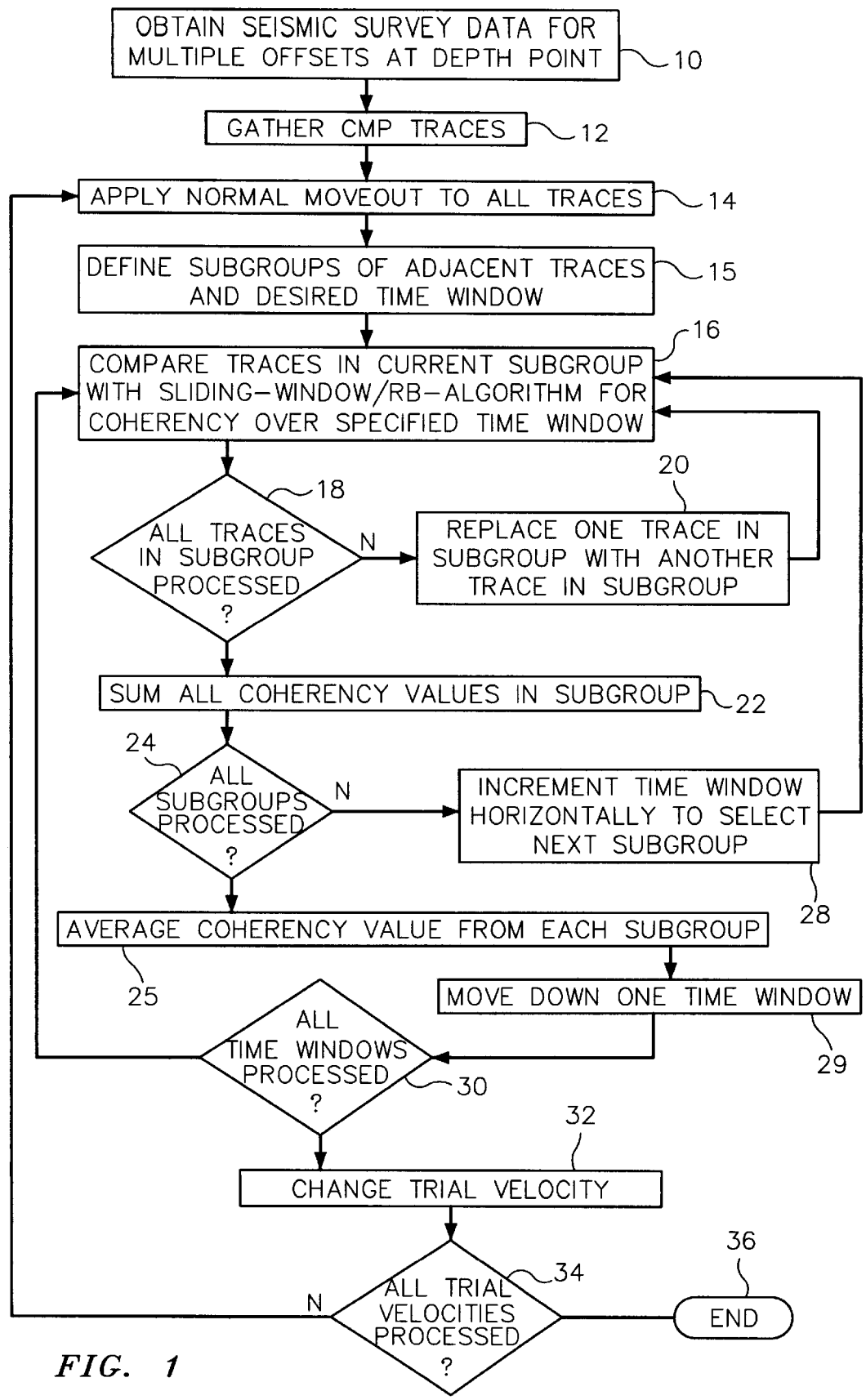
FIG. 1 is a simplified computer flow chart for generating seismic velocity spectra which accentuates polarity reversal of traces with offset according to this invention.

The method and apparatus of this invention are directed to processing CMP gathers of seismic traces which can be used to produce velocity spectra data at a plurality of locations along a seismic line. The steps illustrated at 10, 12 and 14 in FIG. 1 illustrate that typical seismic traces are sorted into CMl gathers with normal moveout applied as is well known to those skilled in the art, and any suitable method known to those skilled in the art may be used for steps 10, 12 and 14. Velocity analysis is then conducted on the CMP gathered traces to generate coherency data for selected locations along the seismic line, and in particular the coherency algorithm is modified so as to include coherency data for seismic traces exhibiting polarity reversal with offset. Preferably, the selected CMP values include all or nearly all of the CMP values along the line.

Still referring to FIG. 1, step 16 calls for calculation of coherency using the RB-algorithm. This is accomplished by selecting a relative small subgroup of about three to about seven adjacent traces to form a subgroup, as illustrated in step 15. Also, selected is a time window usually corresponding to the shallowest depth of interest. This subgroup is limited to a few adjacent traces so that zones of positive and negative polarity will not be included in the same subgroup. Preferably the time window is about twenty-eight milliseconds. The RB- algorithm involves calculation of a cross-correlation (CC) term, and an absolute difference (DIF) term, and where each of these terms may be weighted, with a typical weighting being one-half for each term. The RB coherency value for two traces is calculated as follows:

DIF=1−[SUM(ABS(Yi−Xi))/(SUM(ABS(Yi))+SUM(ABS(Xi)))]

RB=weight*CC+(1−weight)*DIF

Where: Yi and Xi are amplitudes of the two waveforms being compared,
CC is the crosscorrelation of the two waveforms being compared; and
DIF is the absolute difference term.

In this multi-trace RB coherency calculation as illustrated at 16, each trace in a subgroup is compared to every other trace in the subgroup, with the RB value for each individual comparison being noted. In step 18, the computer program queries as to whether comparison of all of the traces in the current subgroup have been completed. If not, the next comparison is formed by sliding over one trace, such that one trace in the previous comparison is replaced with another trace within the subgroup as shown in step 20. The program then returns to step 16.

In step 22, a sum of all RB coherency values calculated for the subgroup is retained in memory. The computer program then discriminates at step 24 as to whether or not all of the subgroups for the current window have been processed. If not, the next subgroup is formed by incrementing the time window horizontally over the seismic section to the next defined subgroup, as illustrated in step 28. The program then returns to step 16 where the newly formed subgroup is analyzed as described above. When all of the subgroups in the seismic section have been compared in the current window, the program in step 25 calculates the average coherency value for all of the subgroups tested, and then proceeds to step 29, where the next time window is selected by moving down an increment in time (or depth) corresponding to the selected length of the time window. The program then proceeds to step 30 to determine if all time windows have been processed, and if not the program again returns to step 16. On completion of all time windows, the trial velocity is changed as shown in step 32, and the program then returns to step 14 to apply normal moveout with the current velocity. A typical result of this velocity analysis is presented in the right-hand panel of FIG. 2.

Figure 2:
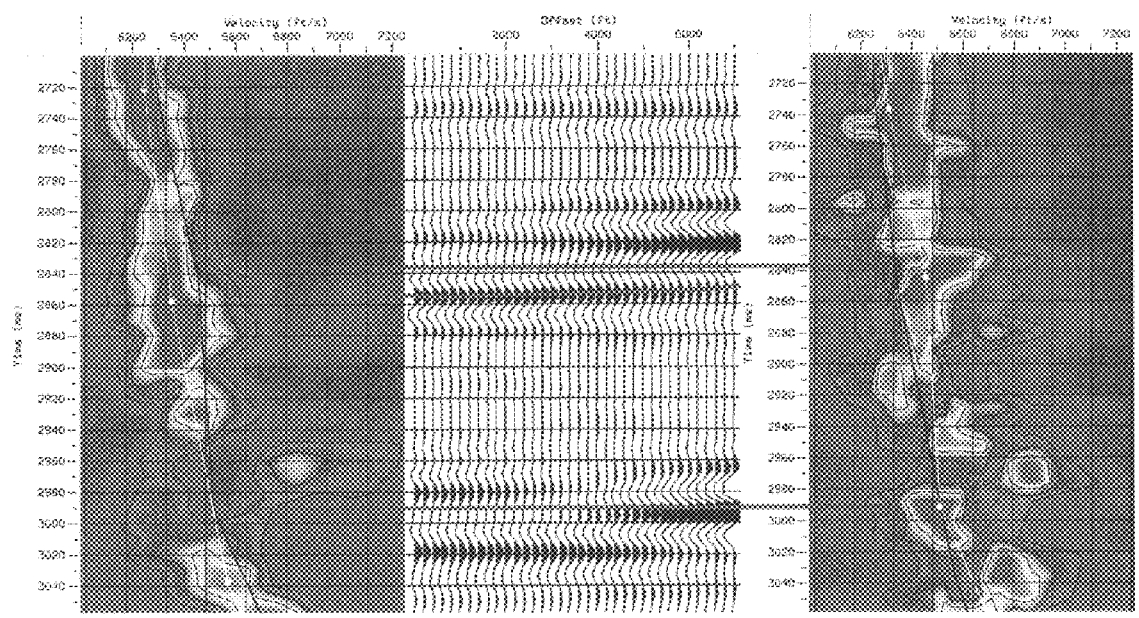
FIG. 2 is a computer generated color display illustrating a seismic record section in a central panel and two velocity analyses of the record section data showing coherency as a function of velocity, which normal moveout implies. The left-hand panel illustrates coherency obtained using well-known semblance coefficients, and the right-hand panel illustrates coherency obtained using RB algorithm coherency calculations, which accentuate polarity reversals in the record section according to this invention.
Figure 3:
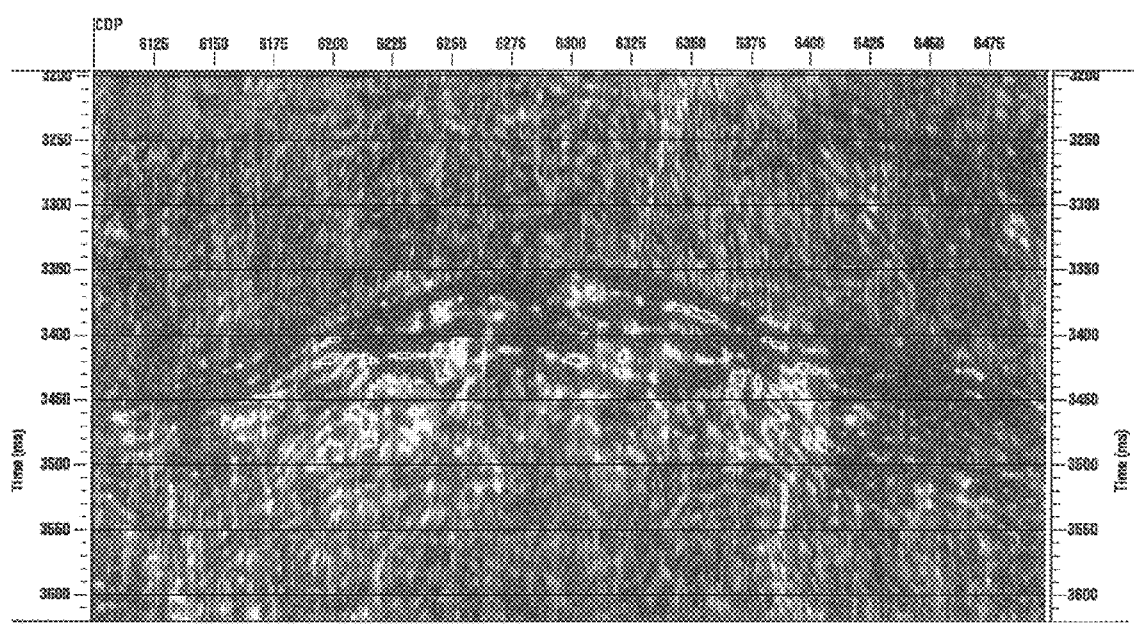
FIG. 3 is a computer generated color display illustrating polarity reversal using velocities picked with semblance coherency.

Referring specifically now to FIG. 2, a central panel illustrating a CMP gather, plus two additional panels, which illustrate velocity analyses of the data in the central panel, are presented. From these two velocity analyses an interpreter can select which velocity values best emphasize the seismic reflections. The two velocity analyses, which are shown in right and left-hand panels, are performed using different coherency calculations. The left-hand panel presents a semblance analysis, and the right-hand panel presents a sliding-window/ RB-algorithm coherency analysis according to the present invention. As seen in FIG. 2, at the letter C, when an event changes polarity with offset as shown at the line connecting the C locations through the central panel, the semblance program (left panel) lacks closing contours to signify the Incorrect velocity. Conversely, the RB-algorithm program has produced a strong closed contour at the letter C to signify the correct velocity for the reflector exhibiting the polarity reversal. The picking of coherency peaks is also illustrated in FIG. 2 where the white lines in both the left and right panels indicates velocity picks for maximum coherency according to the individual analyses.

Figure 4:
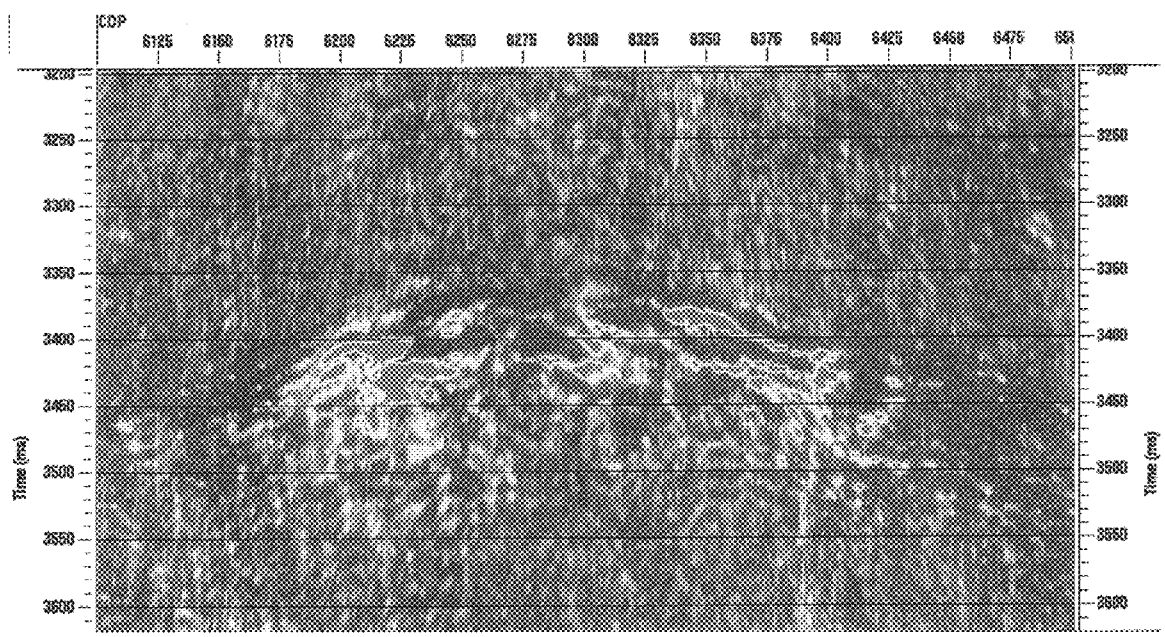
FIG. 4 is a computer generated color display illustrating polarity reversal using velocities picked with the sliding window/RB algorithm for multi-trace coherency.

Further comparison of the semblance velocity analysis versus sliding-window/RB algorithm processing is shown in FIG's. 3 and 4 respectively, where a polarity reversal section is shown for each velocity analysis process. The RB algorithm processing of FIG. 4 shows a "hot spot" on the seismic display wherever polarity reversals exist within the depth point gathers.

In data processing related to FIG's. 3 and 4, a first data set is obtained by stacking data in a normal manner using velocities picked from a velocity analysis of data converted to an absolute value format. A second data set is formed where the NMO corrected gathers are converted to absolute value before stacking and outputting that data set. Then after subtracting the first data set from the second set, the remaining data is displayed using standard seismic plotting and visualization programs. Accordingly, the remaining coherent events on the sections shown in FIG's. 3 and 4 are those that have a polarity reversal with offset as are found in Class II sands.

It will be recognized that the above described invention may be embodied in other specific forms without departing from the spirit or essential characteristics of the disclosure. Thus it is to be understood that the invention is not limited by the foregoing illustrative details, but rather is to be defined by the appended claims.

That which is claimed is:

1. A method of processing seismic data for a velocity analysis, wherein said data corresponds to a vertical seismic record section, and wherein trace data in said record section includes multiple offsets, and further includes traces exhibiting a polarity reversal with offset in at least a portion of said record section, and wherein said traces exhibiting polarity reversal are presented as contours of coherency in a graphic display of said velocity analysis, said method comprising:

a) applying normal moveout (NMO) to all traces in said seismic record section;

b) defining a plurality of subgroups, wherein each subgroup comprises a plurality of adjacent traces in said record section, and further defining a length of a time for a comparison window;

c) determining a measure of multi-trace coherency for each of said plurality of subgroups using a sliding time window technique and an extended cross-correlation algorithm for determining said measure of multi-trace coherency, and wherein said measure of multi-trace coherency includes values which are representative of said traces exhibiting polarity reversal with offset; and d) graphically displaying said velocity analysis in a time-velocity domain, and including contours of said multi-trace coherency based on said measure of multi-trace coherency for each of said plurality of subgroups determined in step c).

2. A method in accordance with claim 1, wherein said step of determining a measure of multi-trace coherency for each of said plurality of subgroups comprises:

cross correlating each trace with every other trace in each of said subgroups to produce a plurality of cross-correlation terms corresponding to trace pairings within each of said plurality of subgroups;

extending each of said plurality of crosscorrelation terms by adding a corresponding trace-pair term representative of the absolute amplitude difference for the two waveforms being compared to derive a plurality of extended correlations, designated herein as a plurality of RB correlation values, for each subgroup; and summing said plurality of RB correlation values for each subgroup to determine said measure of multi-trace coherency for each subgroup of said plurality of subgroups.

3. A method in accordance with claim 2, wherein said RB correlation value is determined according to the expressions:

$$DIF = 1 - [SUM(ABS(Y_i - X_i))/(SUM(ABS(Y_i)) + SUM(ABS(X_i)))]$$

$$RB = weight*CC + (1-weight)*DIF$$

where: $Y_i$ and $X_i$ are amplitudes of the two waveforms being compared and

CC is the crosscorrelation of the two waveforms being compared.

4. A method in accordance with claim 1, wherein said sliding time window technique comprises:

a) selecting a first subgroup of traces at a first chosen depth on said seismic section;

b) comparing said selected traces in said sliding window to determine said multi-trace coherency value for said chosen depth;
c) incrementally moving said sliding window horizontally over said seismic section to include a neighboring subgroup of traces to be compared in said window;
d) repeating step c) until all of said subgroups have been compared at said chosen depth;
e) summing the coherency values obtained in said steps c) and d)
f) incrementally moving said sliding window vertically on said seismic section to a second chosen depth;
g) repeating steps b), c) d) and e) until all subgroups have been compared at said second chosen depth; and
h) repeating steps f) and g) for subsequent chosen depths to include all depths of interest.

5. A method in accordance with claim 1, wherein said sliding time window comprises a time period of about twenty-eight milliseconds, and wherein said subgroup of traces comprises a range of traces of from about three traces to about seven traces.

6. A method of analyzing seismic survey traces to distinguish the presence of sand formations in a region of the earth corresponding to said seismic survey, wherein said seismic traces are arranged in a vertical seismic record section, and wherein trace data in said record section includes multiple offsets, and further includes traces exhibiting a polarity reversal with offset in at least a portion of said record section, and further wherein said traces exhibiting polarity reversal are presented as contours of coherency in a graphic display of said velocity analysis, said method comprising:
   a) applying normal moveout (NMO) to all traces in said seismic survey;
   b) defining a plurality of subgroups, wherein each subgroup comprises a plurality of adjacent traces in said record section, and further defining a length of a time for a comparison window;
   c) determining a measure of multi-trace coherency for each of said plurality of subgroups using a sliding time window technique and an extended cross-correlation algorithm for determining said measure of multi-trace coherency, and wherein said measure of multi-trace coherency includes values which are representative of said traces exhibiting a polarity reversal with offset;
   d) graphically displaying said velocity analysis in a time-velocity domain, and including contours of said multi-trace coherency based on said measure of multi-trace coherency for each of said plurality of subgroups determined in step c); and
   e) using said velocity analysis for determining a stacking velocity that will maximize coherency of said traces exhibiting a polarity reversal with offset to distinguish the presence of sand formations.

7. A method in accordance with claim 6, wherein said step of determining a measure of multi-trace coherency for each of said plurality of subgroups comprises:
   cross-correlating each trace with every other trace in each of said subgroups to produce a plurality of cross-correlation terms corresponding to trace pairings within each of said plurality of subgroups;
   extending each of said plurality of cross-correlation terms by adding a corresponding trace-pair term representative of the absolute amplitude difference for the two waveforms being compared to derive a plurality of extended correlations, designated herein as a plurality of RB correlation values, for each subgroup; and
   summing said plurality of RB correlation values for each subgroup to determine said measure of multi-trace coherency for each subgroup of said plurality of subgroups.

8. A method in accordance with claim 7, wherein said RB correlation value is determined according to the expressions:

$$DIF=1-[SUM(ABS(Y_i-X_i))/(SUM(ABS(Y_i))+SUM(ABS(X_i)))]$$

$$RB=weight*CC+(1-weight)*DIF$$

where: $Y_i$ and $X_i$ are amplitudes of the two waveforms being compared and

CC is the cross-correlation of the two waveforms being compared.

9. A method in accordance with claim 6, wherein said sliding time window comprises a time period of about twenty-eight milliseconds, and wherein said subgroup of traces comprises a range of traces of from about three traces to about seven traces.

10. Apparatus for analyzing seismic survey traces to distinguish the presence of sand formations in a region of the earth corresponding to said seismic survey, wherein said seismic traces are arranged in a vertical seismic record section, and wherein trace data in said record section includes multiple offsets, and further includes traces exhibiting a polarity reversal with offset in at least a portion of said record section, and firer wherein said traces exhibiting polarity reversal are presented as contours of coherency in a graphic display of said velocity analysis, said apparatus comprising:
   a computer programmed for:
      i) applying normal moveout (NMO) to all traces in said seismic survey;
      ii) defining a plurality of subgroups, wherein each subgroup comprises a plurality of adjacent traces in said record section, and further defining a length of a time for a comparison window;
      iii) determining a measure of multi-trace coherency for each of said plurality of subgroups using a sliding time window technique and an extended cross-correlation algorithm for determining said measure of multi-trace coherency, and wherein said measure of multi-trace coherency includes values which are representative of said traces exhibiting a polarity reversal with offset;
      iv) graphically displaying said velocity analysis in a time-velocity domain, and including contours of said multi-trace coherency based on said measure of multi-trace coherency for each of said plurality of subgroups determined in step c); and
      v) using said velocity analysis for determining a stacking velocity that will maximize coherency of said traces exhibiting a polarity reversal with offset to distinguish the presence of sand formations.

11. An apparatus in accordance with claim 10, wherein said step of determining a measure of multi-trace coherency for each of said plurality of subgroups comprises:
   cross-correlating each trace with every other trace in each of said subgroups to produce a plurality of cross-correlation terms corresponding to trace pairings within each of said plurality of subgroups;
   extending each of said plurality of crosscorrelation terms by adding a corresponding trace-pair term representative of the absolute amplitude difference for the two waveforms being compared to derive a plurality of extended correlations, designated herein as a plurality of RB correlation values, for each subgroup; and summing said plurality of RB correlation values for each subgroup to determine said to determine said measure of multi-trace coherency for each subgroup of said plurality of subgroups.

12. An apparatus in accordance with claim 11, wherein said RB correlation value is determined according to the expressions:

$$DIF=1-[SUM(ABS(Yi-Xi))/(SUM(ABS(Yi))+SUM(ABS(Xi)))]$$

$$RB=weight*CC+(1-weight)*DIF$$

where: Yi and Xi are amplitudes of the two waveforms being compared and

CC is the cross-correlation of the two waveforms being compared.

* * * * *

UNITED STATES PATENT AND TRADEMARK OFFICE
CERTIFICATE OF CORRECTION

PATENT NO. : 6,289,285 B1
DATED : September 11, 2001
INVENTOR(S) : Dennis B. Neff and Carl B. Sigler, III Page 1 of 1

It is certified that error appears in the above-identified patent and that said Letters Patent is hereby corrected as shown below:

Column 8, claim 10,
Line 29, delete "firer" and insert therefor -- further --.

Signed and Sealed this

Twelfth Day of March, 2002

Attest:

Attesting Officer

JAMES E. ROGAN
Director of the United States Patent and Trademark Office